(12) United States Patent
Czajkowski

(10) Patent No.: US 6,594,749 B1
(45) Date of Patent: Jul. 15, 2003

(54) SYSTEM AND METHOD FOR MEMORY MANAGEMENT USING FIXED-SIZE BLOCKS

(75) Inventor: Grzegorz Czajkowski, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/574,966

(22) Filed: May 19, 2000

(51) Int. Cl.$^7$ ............................................. G06F 12/06
(52) U.S. Cl. ........................................ 711/170; 707/206
(58) Field of Search .................................. 707/206, 101, 707/103 R; 711/170, 171, 172, 173, 159, 6, 165

(56) References Cited

U.S. PATENT DOCUMENTS

| | | | | |
|---|---|---|---|---|
| 5,561,786 A | * | 10/1996 | Morse | 711/170 |
| 6,141,737 A | * | 10/2000 | Krantz et al. | 709/200 |
| 6,154,823 A | * | 11/2000 | Benayon et al. | 711/171 |
| 6,275,916 B1 | * | 8/2001 | Weldon et al. | 711/170 |
| 6,289,360 B1 | * | 9/2001 | Kolodner et al. | 707/200 |
| 6,321,240 B1 | * | 11/2001 | Chilimbi et al. | 707/102 |
| 6,330,556 B1 | * | 12/2001 | Chilimbi et al. | 711/129 |
| 6,360,361 B1 | * | 3/2002 | Larus et al. | 714/35 |

FOREIGN PATENT DOCUMENTS

| | | | | |
|---|---|---|---|---|
| EP | 0 446 940 | | 9/1991 | |
| WO | 99/31582 | | 6/1999 | |
| WO | WO 01/90899 A2 | * | 11/2001 | G06F/12/02 |

OTHER PUBLICATIONS

Silberschatz and Galvin, Operating System Concepts 5th edition, 1999, pp. 251–261.*

(List continued on next page.)

*Primary Examiner*—Matthew Kim
*Assistant Examiner*—Pierre-Michel Bataille
(74) *Attorney, Agent, or Firm*—Meyertons Hood Kivlin Kowert & Goetzel, P.C.; B. Noël Kivlin

(57) ABSTRACT

A system and method for memory allocation from a heap comprising memory blocks of a uniform fixed size. Each memory block has a status bit. A binary status key stores a Boolean value indicating free memory. The heap is scanned in order until a sequence of a requested quantity of free contiguous memory blocks is found or NULL is returned. Each scanned free memory block is marked un-free by assigning its status bit to the logical negative of the binary status key. If the end of the heap is reached before a sequence of sufficient quantity is found, all reachable blocks are marked as free. The binary status key is flipped such that all memory blocks which were marked free are now un-free, and vice versa. Any memory block whose corresponding structure has become unreferenced is reclaimed for future use. The scan then continues from the beginning of the heap. In another embodiment, a memory allocation for a partitioned data structure from a heap of fixed-size memory blocks may be used. The quantity of memory blocks required to store a data structure is determined. The required quantity of the memory blocks, which may be noncontiguous, is allocated from the heap. The allocated memory blocks are linked in a list such that the components of the data structure are partitioned in the proper order across the allocated quantity of memory blocks.

22 Claims, 7 Drawing Sheets

OTHER PUBLICATIONS

Jones et al., "Garbage Collection: Algorthms for Automatic Dynamic Memory Management"British Library Cataloguing in Publication Data, pp. 87–88.*

White et al., "The GC Interface in the EVM[1]," Dec. 1998, pp. 1–45.

"Dynamic Memory Allocation using Fixed Size Blocks in a Shared Memory Space," IBM Technical Disclosure Bulletin, vol. 38, No. 8, Aug. 1995, p. 189.

"Copying Fragmented Data Structures into Contiguous Memory," IBM Technical Disclosure Bulletin, vol. 36, No. 9, Sep. 1993, p. 141.

Martinez, "Smart memory architecture and methods," Future Generations Computer Systems, vol. 6, No. 2, Nov. 1990, pp. 145–162.

International Search Report, application No. PCT/US 01/16301, mailed Jan. 3, 2002.

* cited by examiner

SYSTEM AND METHOD FOR MEMORY MANAGEMENT USING FIXED-SIZE BLOCKS

BACKGROUND OF THE INVENTION

1. Field of the Invention

The present invention relates generally to computer software. More particularly, the present invention relates to memory management with non-compacting garbage collection.

2. Description of the Relevant Art

The term "memory management" generally denotes a collection of techniques for providing sufficient memory to one or more processes in a computer system, especially when the system does not have enough memory to satisfy all processes' requirements simultaneously. Memory management techniques include swapping, paging, virtual memory, and garbage collection. Memory management is usually performed primarily by a hardware memory management unit. Automatic memory management refers to memory management processes which do not require user intervention.

In general, the overheads of automatic memory management can be attributed to allocations of new data structures (e.g., objects), detecting alive (i.e., reachable) objects, disposing of unreachable objects, and memory compaction. Some algorithms do not have all of the above components, and various algorithms differ substantially in the amount of overhead contributed by each of the above-listed components. For example, a mark-and-sweep algorithm may spend a significant amount of time on sweeping memory and merging discovered free blocks into larger contiguous regions, while the main source of overhead of copying-based garbage collection comes from memory compaction. Different algorithms behave differently with respect to space as well; non-copying algorithms typically do not prevent memory fragmentation at all while copying algorithms compact memory to reduce fragmentation.

One of the primary problems encountered in memory management is fragmentation, which is the process or result of splitting a large area of free memory (e.g., on disk or in main memory) into smaller non-contiguous blocks. Fragmentation may occur after many blocks have been allocated and freed. For example, if there are three kilobytes of free space and two 1 k blocks are allocated and then the first one (at the lowest address) is freed, then there will be 2 k of free space split between the two 1 k blocks. The maximum size block that could then be allocated would be 1 k even though there are 2 k free. One solution is to "compact" the free space by moving the allocated blocks to one end (and thus the free space to the other). Fragmentation related to RAM that has small, unused holes scattered throughout it is called external fragmentation. With modem operating systems that use a paging scheme, a more common type of RAM fragmentation is internal fragmentation. Internal fragmentation occurs when memory is allocated in frames, and the frame size is larger than the amount of memory requested.

Garbage collection is the process by which dynamically allocated storage is reclaimed during the execution of a program. The term usually refers to automatic periodic storage reclamation by the garbage collector (usually part of the run-time system), as opposed to explicit code to free specific blocks of memory. Automatic garbage collection is usually triggered during memory allocation when the amount of free memory falls below some threshold or after a certain number of allocations. Normal execution is suspended and the garbage collector is run. There are many variations on this basic scheme. Languages like Lisp represent expressions as graphs built from cells which contain pointers and data. These languages use automatic dynamic storage allocation to build expressions. During the evaluation of an expression it is necessary to reclaim space which is used by sub expressions but which is no longer pointed to by anything. This reclaimed memory is returned to the free memory pool for subsequent reallocation. Without garbage collection the program's memory requirements would increase monotonically throughout execution, possibly exceeding system limits on virtual memory size. The three main methods are mark-and-sweep garbage collection, reference counting, and copying garbage collection.

In the mark-and-sweep garbage collection scheme, each cell has a bit reserved for marking which is clear initially. During garbage collection, all active cells are traced from the root and marked. Then all cells are examined and unmarked cells are freed.

In the reference counting scheme, each memory cell contains a count of the number of other cells which point to it. If this count reaches zero, the cell is freed and its pointers to other cells are followed to decrement their counts, and so on recursively. This technique cannot cope with circular data structures. Cells in such structures refer (indirectly) to themselves and so will never have a zero reference count. This means they would never be reclaimed, even when there are no references from outside the structure.

In copying-based garbage collection schemes, memory is typically divided into two equal halves, known as the "from space" and "to space." Garbage collection copies active cells from the "from space" to the "to space" and leaves behind an invisible pointer (an "indirection") from the old position to the new copy. Once all active cells have been copied in one direction, the spaces are swapped and the process is repeated in the opposite direction. Each time the cells are copied from one space to the other, they are compacted to remove any unused space between them.

A garbage collector must determine which data structures, such as objects, are in use and which are not. A program executing a set of methods may have arguments or local variables that are references to objects. These references are said to belong to a root set of references that are immediately accessible to the program. All objects referenced by this root set of references are said to be reachable by the program in its current state and should not be collected by a garbage collector. Also, those objects might contain references to still other objects, which are also reachable, and so on. All other objects on the heap are considered unreachable, and all unreachable objects are typically eligible for garbage collection and may be reclaimed during garbage collection. Garbage collection algorithms vary, but they typically have in common the task of identifying the objects that are reachable from the root set and reclaiming the space occupied by any other objects. An object may refer to reachable objects and still be unreachable itself. Likewise, an object can be unreachable in spite of references to it, if those references are all from unreachable objects.

Statistical studies show that most objects are small. Many implementations of automatic memory management algorithms take this into account, for instance, by pre-allocating larger chunks of memory and then using them for fast allocation space for small objects. However, fragmentation may still present memory management problems when many of the small objects are allocated and de-allocated during program execution. Memory management approaches to fragmentation which rely upon copying, such as compaction schemes, may require significant overhead, yet the problems associated with memory fragmentation typically require compaction to be solved. Similarly, when many small, short-lived objects are allocated and de-allocated, discovering unreachable objects and making unreachable memory available for allocations may incur large overheads.

Therefore, an improved system and method for memory management are desired.

SUMMARY OF THE INVENTION

The problems outlined above are in large part solved by various embodiments of a system and method for memory management. In one embodiment, a memory heap comprises a plurality of memory blocks of a uniform and fixed size. The uniform size of the memory blocks removes the need for variable-size memory block management, which may be substantial in that variable-size memory blocks must have size information associated with them, and the memory manager must read and manage this information. In one embodiment, each memory block in the heap may have associated with it a status bit indicating that block's current allocation status. In one embodiment, a binary status key stores a Boolean value indicating free memory. Any memory block in the heap whose status bit holds this value is considered to be free for allocation. Memory allocation from the heap may be performed by a memory management program.

A memory allocation process for a partitioned data structure from a heap of fixed-size memory blocks may be used to mitigate problems related to memory fragmentation in non-compacting memory allocation and garbage collection systems. The method may also be used as a "last resort" method when allocation under a non-compacting garbage collection scheme has failed. A request may be received to allocate storage for a data structure from a heap of uniform and fixed-size memory blocks. In one embodiment, the data structure may be an object in an object-oriented language such as C++ or the Java™ Language. The data structure may also include any primitive data type (e.g., an integer, floating point number, character, etc.), array, or structured data type. Each of the blocks in the heap may be of a uniform fixed size to improve the efficiency of the memory management process.

The size of the structure may be determined by partitioning the structure into one or more components in a particular order, wherein each of the one or more components does not exceed the fixed size of the fixed-size memory blocks, and determining a quantity of the plurality of memory blocks required to store the components of the structure. The required quantity of the memory blocks may then be allocated from the heap. In one embodiment, the allocated quantity of memory blocks may include at least two non-contiguous memory blocks. Finally, the allocated memory blocks may be linked in a list such that the components of the structure are partitioned in the particular order of the components across the allocated quantity of memory blocks.

In one embodiment, the data structure may be an object, and allocating memory for the object may further include instantiating the object in the allocated quantity of memory blocks.

Further optimizations may be employed with the system and method described above. In one embodiment, the components of the structure may be reordered such that rarely accessed components of the structure are placed at the end of the component order before linking the allocated memory blocks. In one embodiment, allocating space for arrays or other large data structures may result in many "hops" (i.e., traversal of many links) to reach array entries with high index values. This problem may be mitigated by laying array entries as leaves of a binary tree, in which case access time for array entries is proportional to log (array size).

BRIEF DESCRIPTION OF THE DRAWINGS

Other objects and advantages of the invention will become apparent upon reading the following detailed description and upon reference to the accompanying drawings in which.

Figure 1:
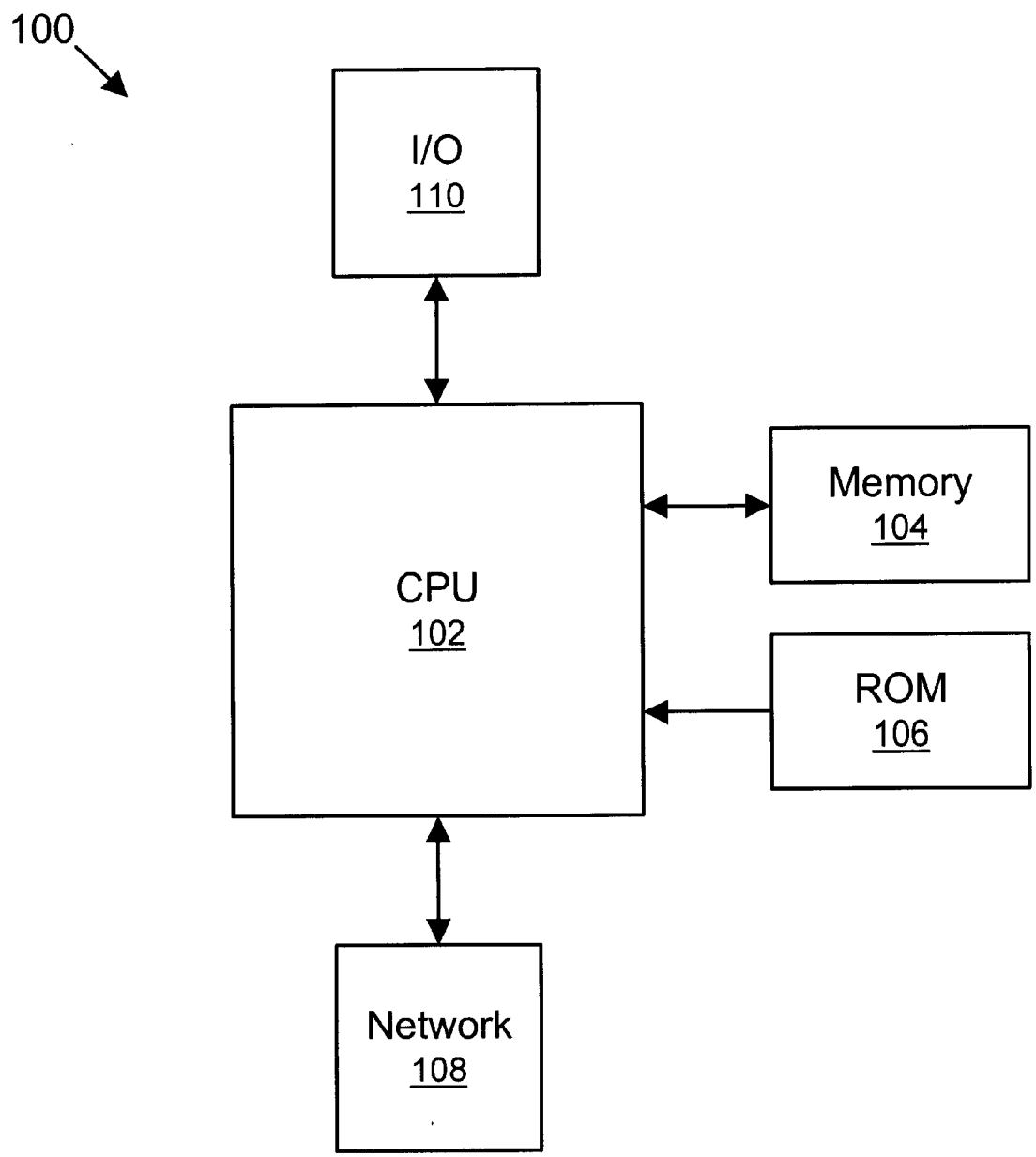
FIG. 1 is an illustration of a typical computer system architecture which is suitable for implementing various embodiments.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1: A Typical Computer System

Turning now to the drawings, FIG. 1 is an illustration of a typical, general-purpose computer system 100 which is suitable for implementing the system and method for memory management as disclosed herein.

The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory" and "memory medium" may include an installation medium, e.g., a CD-ROM or floppy disk, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system 100 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for memory management accordance as disclosed herein may therefore be implemented on a plurality of heterogeneous or homogeneous networked computer systems 100 through one or more networks 108. The CPU 102 may acquire instructions and/or data for implementing the system and method for memory management as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for memory management as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in the Java™ Language. The Java™ Language is described in *The Java Language Specification* by Gosling, Joy, and Steele (Addison-Wesley, ISBN 0-201-63451-1), which is incorporated herein by reference. A general discussion of the Java™ Language follows. The Java™ Language is an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Figure 2A:
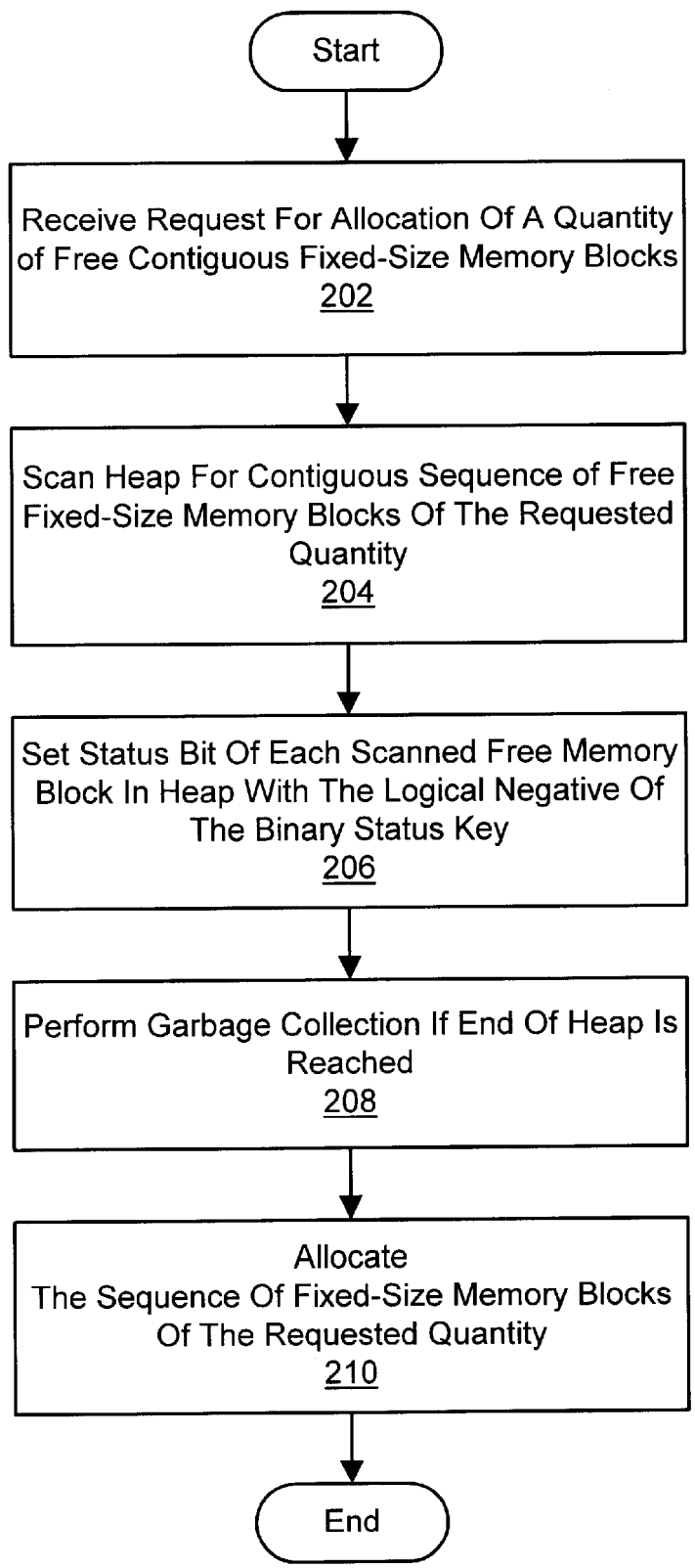
FIGS. 2a and 2b are flowcharts illustrating a fixed-size memory block allocation method according to one embodiment.

FIG. 2a: A Fixed-Size Memory Block Allocation Process

FIG. 2a is a flowchart illustrating the process of memory allocation from a heap of fixed-size memory blocks according to one embodiment. Each memory block in the heap may have associated with it a status bit indicating that block's current allocation status. The memory allocation may be performed by a memory management program. In one embodiment, a binary status key stores a Boolean value indicating free memory. Any memory block in the heap whose status bit holds this value is considered to be free for allocation. Each of the memory blocks is of a uniform and fixed size. Constraining the memory blocks in the heap to a fixed size provides for greater efficiency as it removes the need for variable-size memory block management, which may be substantial in that variable-size memory blocks must have size information associated with them, and the memory manager must read and manage this information. As FIG. 2a shows, in 202 a request is received for allocation of a quantity of contiguous fixed-size memory blocks, such as to store a data structure or instantiate an object.

In 204, the heap is scanned for a contiguous sequence of free fixed-size memory blocks of the requested quantity. The scan starts at a memory block pointed to by a "current" pointer, and proceeds, examining each sequence of free contiguous memory blocks in order until either a sequence of the requested quantity is found, or the end of the heap is reached. In one embodiment, the heap is scanned from left to right from the location pointed to by the current pointer. As part of the scanning process, in 206, the status bit of each scanned free memory block is set to the logical negative of the binary status key, i.e., marked as un-free. This status bit may become relevant during the garbage collection phase, described below. Any sequence of free blocks which has less than the requested quantity of memory blocks may be skipped but marked as un-free.

If the end of the heap is reached before a sequence of sufficient quantity is found and the allocation made, then in 208, the garbage collection process is executed. This process, described in more detail with reference to FIG. 2b, reclaims unused memory and sets the current pointer at the beginning of the heap, where the scan may then continue. In one embodiment, if the entire heap has been scanned for the requested allocated memory, and no sequence of free memory blocks of sufficient quantity has been found, the memory management program may return a NULL value to the requesting program. In 210, the requested quantity of memory blocks is allocated from the heap and returned to the calling program.

Figure 2B:
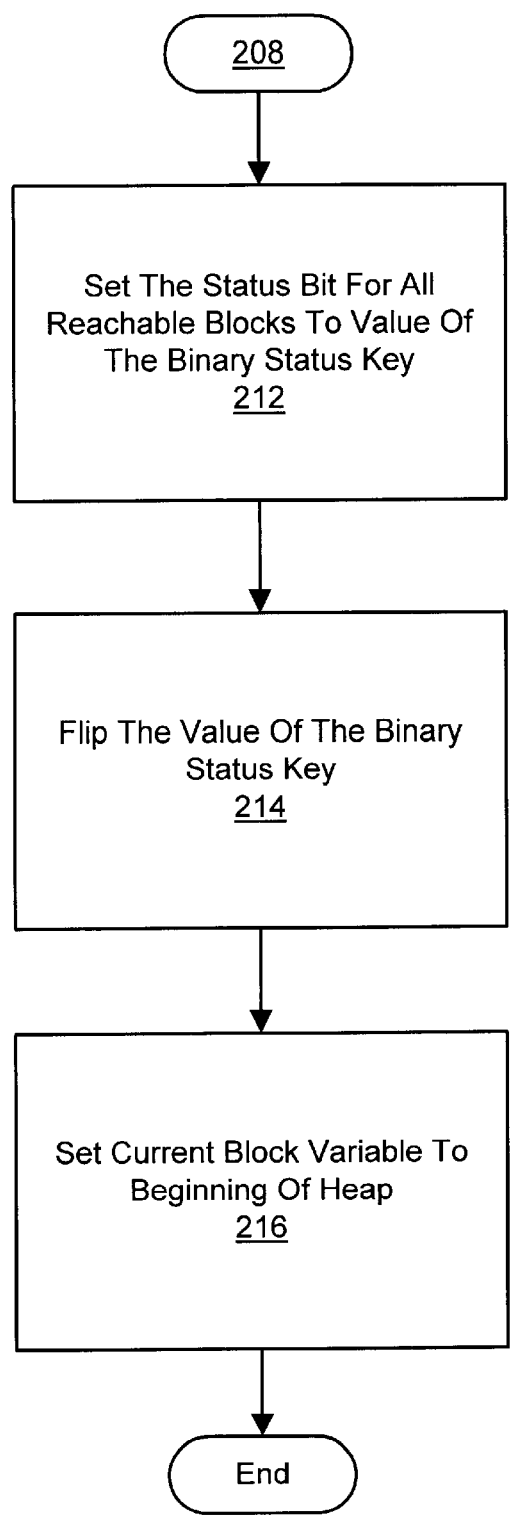

FIG. 2b: Garbage Collection Process

FIG. 2b illustrates the garbage collection step 208 of FIG. 2a in greater detail. As shown in FIG. 2b, in 212, the garbage collection process sets the status bit for all reachable (e.g., belonging to "alive" data structures or objects) blocks of memory to the value of the binary status key, described above with reference to FIG. 2a. This marks all reachable blocks of memory as free. Then, in 214, the binary status key is flipped, i.e., set to its logical negative (e.g., non-zero changed to zero, or zero changed to non-zero). This flip provides a new context to all the memory blocks which have been marked during the heap scan, described above with reference to FIG. 2a. As a result, all memory blocks which were marked free are now considered un-free, while any memory blocks marked as un-free are now considered to be free, or available for allocation. In this manner, any memory block whose corresponding structure or object has become unreferenced (i.e., is not "alive") is reclaimed for future use. In 216, the current pointer, also referred to as the current block variable, is set to the beginning of the heap, from which the heap scan may subsequently proceed.

Figure 3:
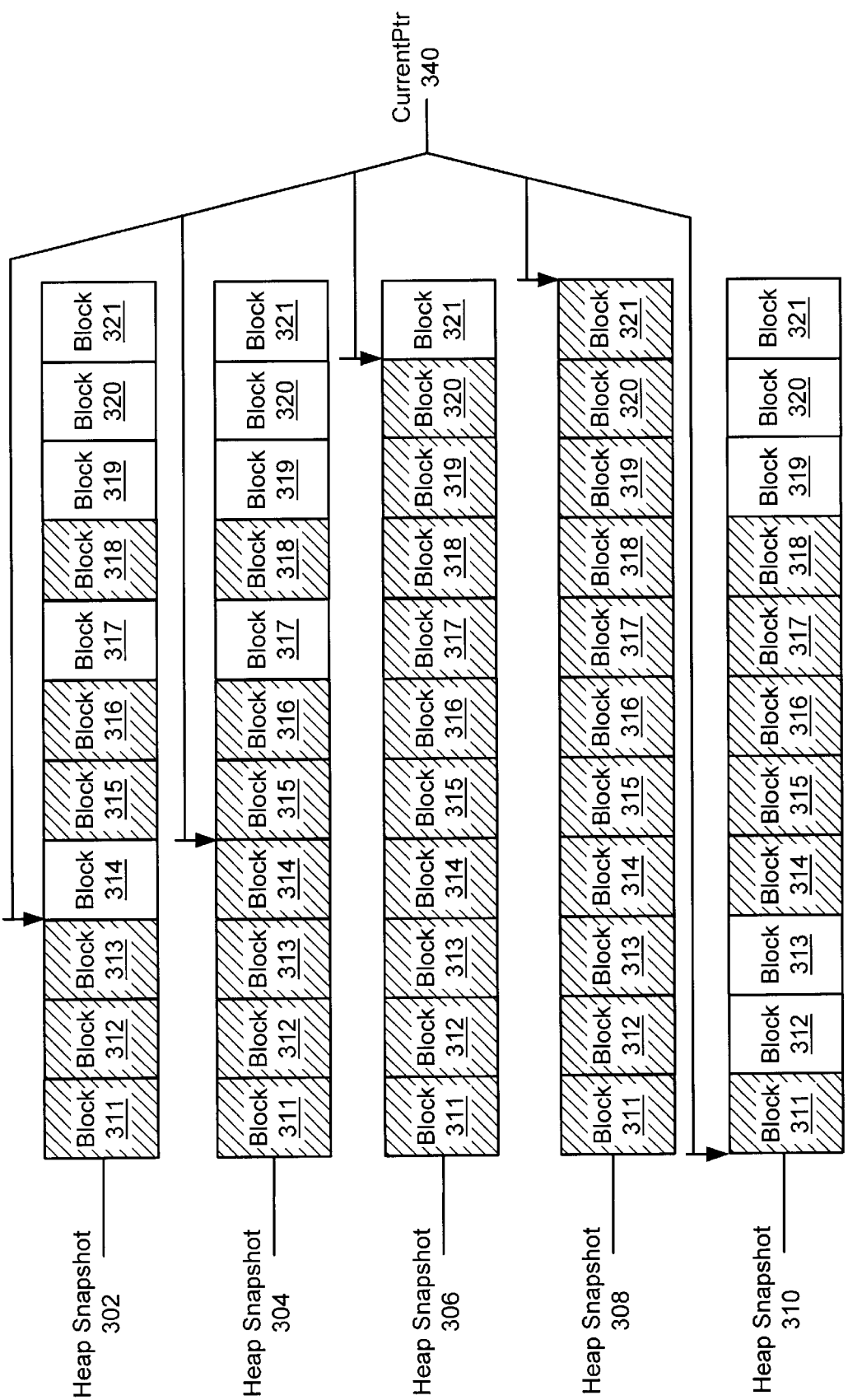
FIG. 3 is an illustration of fixed-size memory block allocation with garbage collection according to one embodiment.

FIG. 3: Fixed-Size Memory Block Allocation With Garbage Collection

FIG. 3 illustrates an example of a memory allocation process according to one embodiment and according to the methods illustrated in FIGS. 2a and 2b. A series of snapshots of a heap are shown to demonstrate a heap scan for allocations as well as garbage collection. The shaded blocks in the first four snapshots 302–308 represent allocated, or occupied, memory blocks, and the white memory blocks represent unallocated, or free, memory blocks. As mentioned above with reference to FIG. 2a, each memory block in the heap has associated with it a status bit which indicates the current allocation status of that block. In one embodiment, the status bit of each memory block in the heap may be stored as a bit in a bitmap, such that the bitmap holds the status of each memory block in the heap. Each of the memory blocks is of a uniform fixed size which may greatly improve the efficiency of the algorithm, as it removes the cost of variable-sized block management. As described above, as the heap is scanned, each block of unallocated memory is marked as un-free, which changes to free when the status key is flipped during garbage collection. A current pointer indicates the next memory block to be examined.

As FIG. 3 shows, in the first snapshot 302 the current pointer 340 is positioned at the beginning of the fourth memory block 314. A request to allocate memory for a one-block object is quickly satisfied, as shown in the second snapshot 304. The allocated block 314 is marked un-free, as described above. Note that the current pointer 304 is now positioned at the beginning of the fifth block 315. Then, a request to allocate two contiguous blocks is received. Referring again to snapshot 304, the request fails on the fifth block 315 and the sixth block 316 because each is already allocated. The request fails on the free seventh block 317 because two contiguous blocks were requested, but the fact that the eighth block 318 is already allocated means that the seventh block 317 may only be allocated as a single block. Block 317 is marked un-free and skipped. Finally, the request is filled by the allocation of the ninth block 319 and the tenth block 320, resulting in snapshot 306. A subsequent request to allocate one block is filled immediately as shown in snapshot 308 with the allocation of block 321.

At this point, the current pointer 340 is at the end of the heap so garbage collection is performed as described above with reference to FIG. 2b. As a result of garbage collection, the current pointer 340 is positioned at the beginning of the heap at block 311, as shown in snapshot 310. The garbage collection process, as described above, marks every reachable block in the heap as free, then flips the binary status key. Because all un-allocated blocks were marked as un-free before the garbage collection, and all reachable blocks were marked as free, when the binary status key is flipped it results in all blocks which are not reachable (and only those) being marked as free for the next allocation pass. Therefore, in snapshot 310, the shaded blocks represent free memory blocks, while the white blocks represent allocated, or occupied, memory blocks. In snapshot 310, it may be seen that blocks 312, 313, 319, 320, and 321 were marked reachable during the garbage collection process, which means that they still belong to "alive" objects. Conversely, it may be seen that memory blocks 311, 314, 315, 316, 317, and 318 were found to be unreachable during garbage collection, meaning that their respective objects are no longer "alive," and so were collected for further allocations.

In one embodiment, the memory management program described above may be executable by a platform independent virtual machine, such as a Java™ Virtual Machine implemented in accordance with a specification published by Sun Microsystems, Inc., and described below with reference to FIG. 6.

Figure 4:
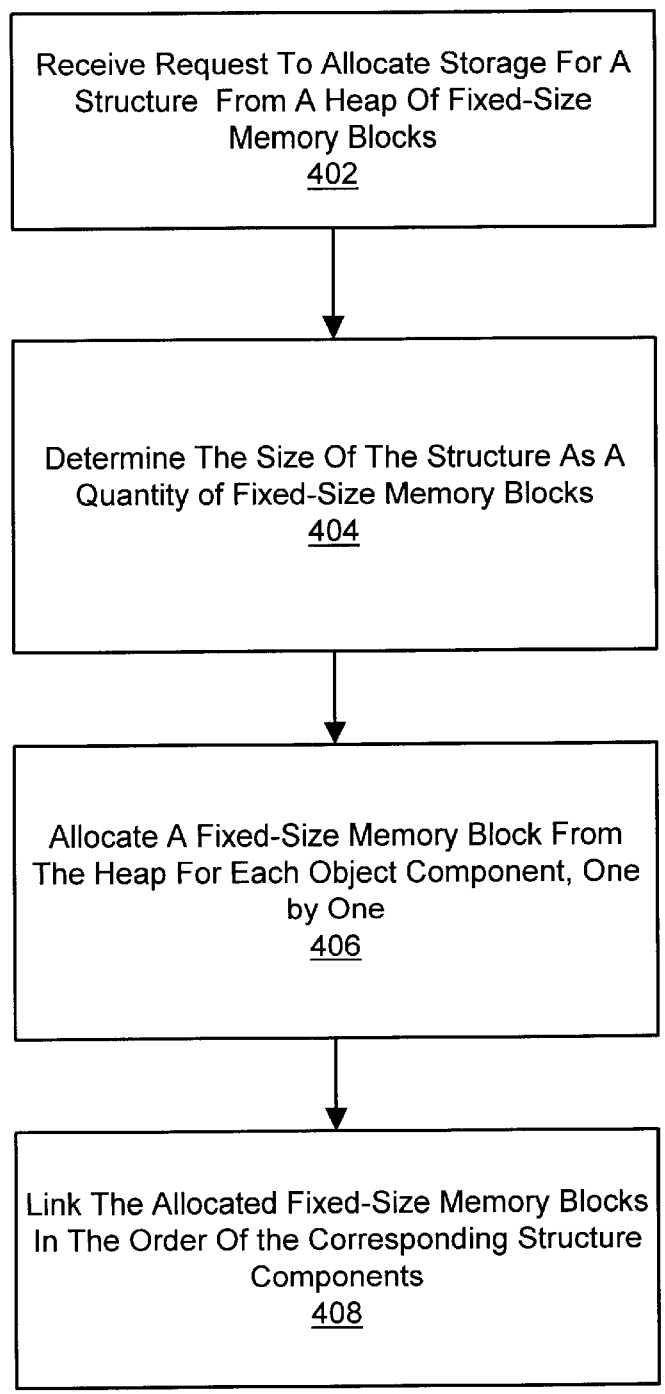
FIG. 4 is a flowchart illustrating allocation of fixed-size memory blocks for a partitioned structure according to one embodiment.

FIG. 4: Allocation For A Partitioned Structure With Fixed-Size Memory Blocks

The properties of the memory allocator described with reference to FIGS. 2a, 2b, and 3 make that approach a good match for certain classes of environments, such as environments which include many small data structures (e.g., objects). However, the lack of compaction and possible resulting fragmentation in the approach described above may be problematic, especially when many large objects are encountered. Assuming a uniform distribution of "alive" objects on the heap after garbage collection, the probability of allocating N consecutive blocks during the first attempt decreases geometrically with N.

One solution to the fragmentation problem would be to provide separate heaps for objects of different sizes. However, an accurate assessment would have to be made of the number of objects and their sizes, and such an assessment would be difficult. Another solution would include adding a compacting phase to the allocation system and method. Such a phase might include defragmenting the heap by copying blocks from one location to another. However, it is not clear what the computational costs of the compacting phase would be.

FIG. 4 is a flowchart illustrating a memory allocation process for a partitioned data structure from a heap of fixed-size memory blocks is presented. The method shown in FIG. 4 may be used to mitigate problems related to memory fragmentation in non-compacting memory allocation and garbage collection systems, such as the system and method described with reference to FIGS. 2a, 2b, and 3. The method shown in FIG. 4 may also be used as a "last resort" method when allocation under a non-compacting garbage collection scheme has failed. As FIG. 4 shows, in 402, a request may be received to allocate storage for a data structure from a heap of uniform and fixed-size memory blocks. In one embodiment, the data structure may be an object in an object-oriented language such as C++ or the Java™ Language. The data structure may also include any primitive data type (e.g., an integer, floating point number, character, etc.), array, or structured data type. As mentioned above, each of the blocks in the heap may be of a uniform fixed size to improve the efficiency of the memory management process.

In 404, the size of the structure may be determined. In one embodiment, determining the size of the structure may include partitioning the structure into one or more components in a particular order, wherein each of the one or more components does not exceed the fixed size of the fixed-size memory blocks, and determining a quantity of the plurality of memory blocks required to store the components of the structure.

In 406, the required quantity of the memory blocks may be allocated from the heap. In one embodiment, the allocated quantity of memory blocks may include at least two noncontiguous memory blocks.

Finally, in 408, the allocated memory blocks may be linked in a list such that the components of the structure are partitioned in the particular order of the components across the allocated quantity of memory blocks.

In one embodiment, the data structure may be an object, and allocating memory for the object may further include instantiating the object in the allocated quantity of memory blocks.

Further optimizations may be employed with the system and method illustrated with reference to FIG. 4. In one embodiment, the components of the structure may be reordered such that rarely accessed components of the structure are placed at the end of the component order before the linking the allocated memory blocks. In one embodiment, allocating space for arrays or other large data structures may result in many "hops" (i.e., traversal of many links) to reach array entries with high index values. This problem may be mitigated by laying array entries as leaves of a binary tree. Therefore, access time for array entries is proportional to log(array size).

Figure 5:
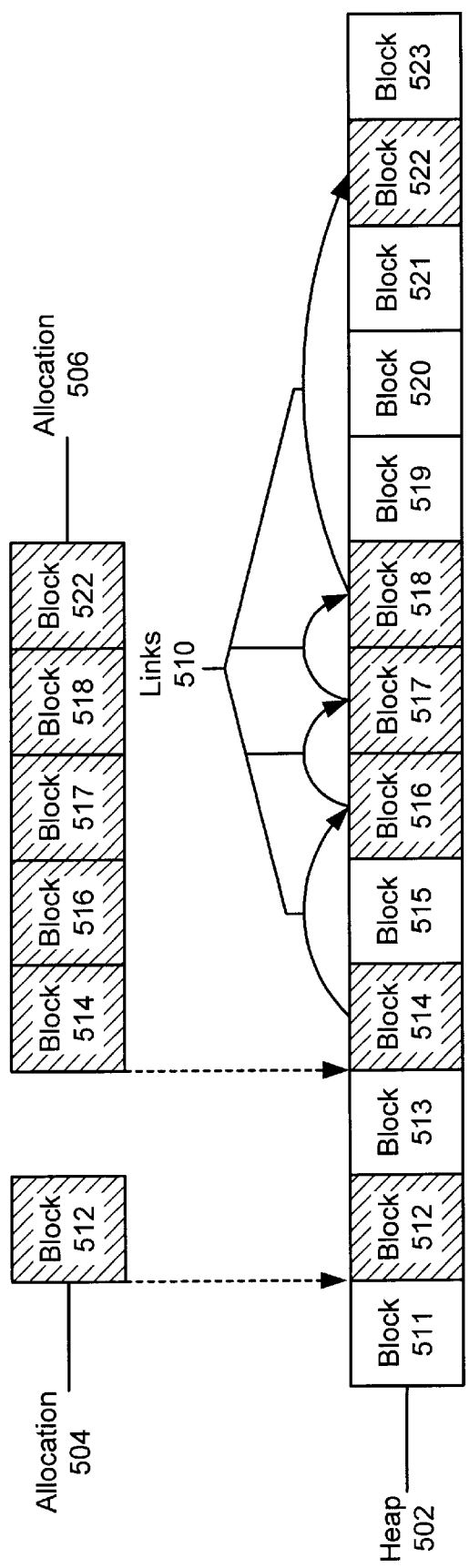
FIG. 5 illustrates an allocation of fixed-size memory blocks for a partitioned structure according to one embodiment.

FIG. 5: Allocation of Fixed-Size Memory Blocks For a Partitioned Structure

FIG. 5 illustrates examples of allocations of fixed-size memory blocks from a heap according to one embodiment and according to the method illustrated in FIG. 4. As FIG. 5 shows, a heap 502 comprises a plurality of memory blocks 511–523, which are each of uniform fixed size. In the diagram of the heap 502, shaded blocks represent un-allocated (free) memory, while white blocks represent allocated (un-free) memory. In this illustration, a first allocation 504 of a single block of memory has been requested from the heap 502, and has been filled by allocation of block 512. Subsequently, a second allocation 506 is requested from the heap 502 and is filled in the following manner. First, block 513 is skipped, because it is already allocated. Then free block 514 is selected. Block 515 is skipped for the same reason as block 513. Blocks 516, 517, and 518 are each selected for allocation because each is free. Un-free blocks 519–521 are skipped, then free block 522 is selected for the fifth block of the requested allocation 506, producing a group of memory blocks consisting of blocks 514, 516, 517, 518, and 522. As described above with reference to FIG. 4, the allocated memory blocks may be linked together such that the order of the components of the structure is maintained. Thus, as indicated in FIG. 5, links 510 are used to join the allocated blocks in such a way as to provide access to all component fields of the structure to a user of the structure. In one embodiment, the allocated blocks may be linked in a unidirectional linked list. In an alternate embodiment, the allocated blocks may be linked in a bi-directional linked list. In one embodiment, the fact that the allocated memory comprises linked blocks which are non-contiguous may be transparent to the user (e.g., the program which requests allocation of memory).

In one embodiment, the memory management program described above may be executable by a platform independent virtual machine, such as a Java™ Virtual Machine implemented in accordance with a specification published by Sun Microsystems, Inc., and described below with reference to FIG. 6.

Figure 6:
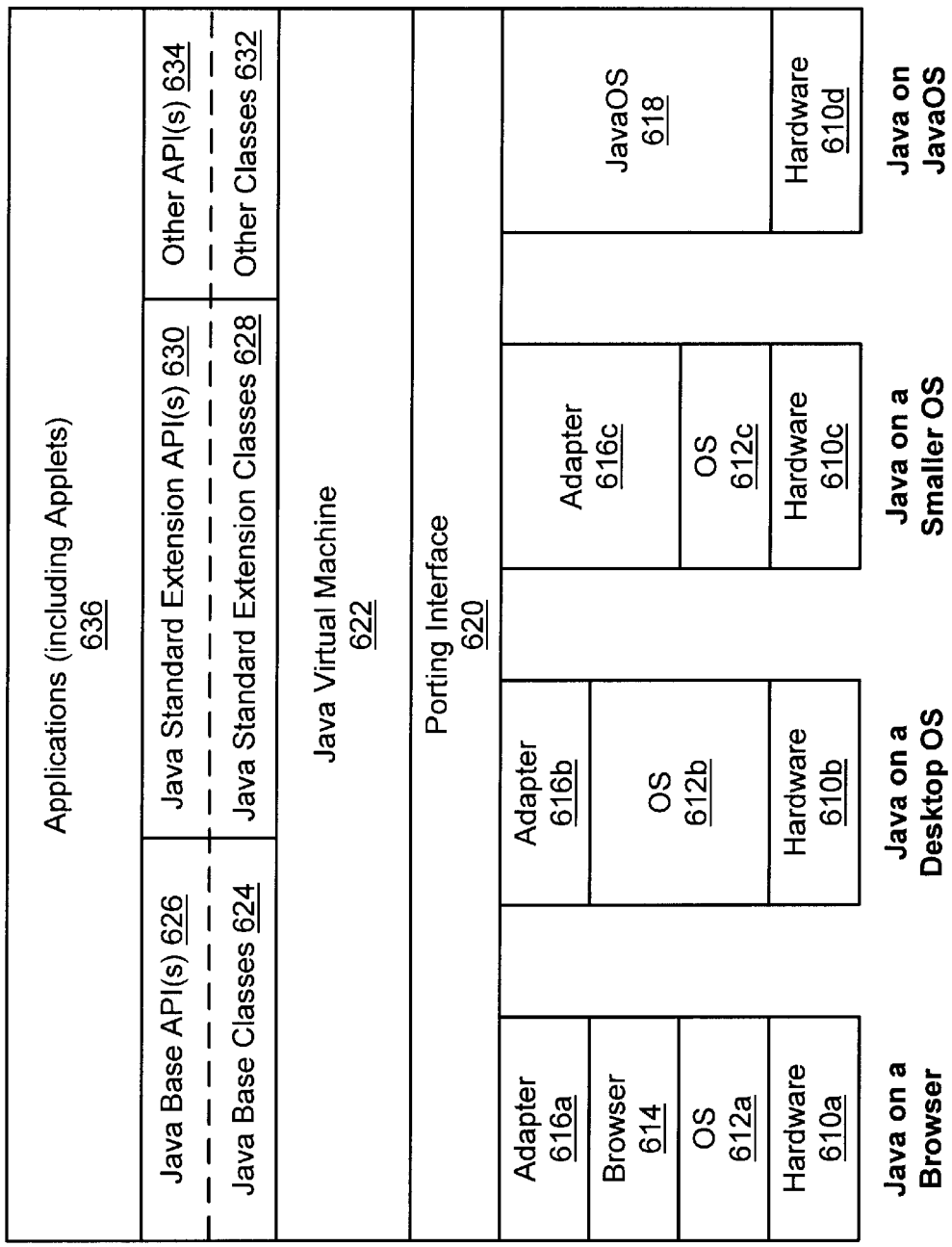
FIG. 6 is an illustration of the Java™ Platform and the relationships between the elements thereof according to one embodiment.

FIG. 6: The Java™ Virtual Machine

The Java™ Virtual Machine 622 is implemented in accordance with a specification for a "soft" computer which can be implemented in software or hardware. As used herein, a "virtual machine" is generally a self-contained operating environment that behaves as if it were a separate computer. As shown in FIG. 6, in one embodiment the Java™ Virtual Machine 622 is implemented in a software layer. Different implementations of the Java™ Virtual Machine 622 may run on a variety of different computing platforms: for example, on a browser 614 sitting on top of an operating system (OS) 612*a* on top of hardware 610*a*; on a desktop operating system 612*b* on top of hardware 610*b*; on a smaller operating system 612*c* on top of hardware 610*c*; or on the JavaOS operating system 618 on top of hardware 610*d*. Computer hardware 610*a*, 610*b*, 610*c*, and 610*d* may comprise different hardware platforms. JavaOS 618 is an operating system that is optimized to run on a variety of computing and consumer platforms. The JavaOS 618 operating environment provides a runtime specifically tuned to run applications written in the Java™ Language directly on computer hardware without requiring another operating system.

The Java™ API or APIs form a standard interface to Java™ applications 636, regardless of the underlying operating system or hardware. The Java™ API or APIs specify a set of programming interfaces between Java™ applications 636 and the Java™ Virtual Machine 622. The Java™ Base API 626 provides the basic language, utility, I/O, network, GUI, and applet services. The Java™ Base API 626 is typically present anywhere the Java™ Platform is present. The Java™ Base Classes 624 are the implementation of the Java™ Base API 626. The Java™ Standard Extension API 630 provides additional capabilities beyond the Java™ Base API 626. The Java™ Standard Extension Classes 628 are the implementation of the Java™ Standard Extension API 630. Other APIs in addition to the Java™ Base API 626 and Java™ Standard Extension API 630 can be provided by the application or underlying operating system. A particular Java™ environment may include additional APIs 634 and the classes 632 which implement them. Each API is organized by groups or sets. Each of the API sets can be implemented as one or more packages or namespaces. Each package groups together a set of classes and interfaces that define a set of related data, constructors, and methods, as is well known in the art of object-oriented programming.

The porting interface 620 lies below the Java™ Virtual Machine 622 and on top of the different operating systems 612*b*, 612*c*, and 618 and browser 614. The porting interface 620 is platform-independent. However, the associated adapters 616*a*, 616*b*, and 616*c* are platform-dependent. The porting interface 620 and adapters 616*a*, 616*b*, and 616*c* enable the Java™ Virtual Machine 622 to be easily ported to new computing platforms without being completely rewritten. The Java™ Virtual Machine 622, the porting interface 620, the adapters 616*a*, 616*b*, and 616*c*, the JavaOS 618, and other similar pieces of software on top of the operating systems 612*a*, 612*b*, and 612*c* may, individually or in combination, act as means for translating the machine language of Java™ applications 636, APIs 626 and 630, and Classes 624 and 628 into a different machine language which is directly executable on the underlying hardware.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for memory management, the method comprising:

receiving a request to allocate storage for a data structure from a heap, wherein the heap comprises a plurality of memory blocks, and wherein each of the plurality of memory blocks is of a uniform fixed size;

determining the size of the data structure, wherein the data structure comprises one or more components in a particular order, wherein each of the one or more components does not exceed the fixed size, and wherein the determining the size of the data structure includes determining a quantity of the plurality of memory blocks required to store the components of the data structure;

allocating the required quantity of the memory blocks from the heap, wherein the allocated quantity of memory blocks includes at least two noncontiguous memory blocks;

linking the allocated memory blocks in a list such that the components of the data structure are partitioned in the particular order of the components across the allocated quantity of memory blocks; and reordering the components of the data structure such that rarely accessed components of the data structure are placed at the end of the component order before said linking the allocated memory blocks.

2. The method of claim 1, wherein the data structure comprises an object.

3. The method of claim 2, further comprising instantiating the object in the allocated quantity of memory blocks.

4. The method of claim 1, wherein the list is a unidirectional list.

5. The method of claim 1, wherein the list is a bi-directional list.

6. The method of claim 1, wherein the method is implemented within a virtual machine.

7. The method of claim 6, wherein the virtual machine is implemented in accordance with a platform-independent virtual machine specification.

8. A system for memory management, the system comprising:

a heap, wherein the heap comprises a plurality of memory blocks, and wherein each of the plurality of memory blocks is of a uniform fixed size; and a memory management program which is operable to receive a request to allocate storage for a data structure from the heap;

wherein the memory management program is further operable to determine the size of the data structure, wherein the data structure comprises one or more components in a particular order, wherein each of the one or more components does not exceed the fixed size, and wherein the memory management program is further operable to determine the size of the data structure by determining a quantity of the plurality of memory blocks required to store the components of the data structure;

wherein the memory management program is further operable to allocate the required quantity of the memory blocks from the heap, wherein the allocated quantity of memory blocks includes at least two noncontiguous memory blocks;

wherein the memory management program is further operable to link the allocated memory blocks in a list such that the components of the data structure are partitioned in the particular order of the components across the allocated quantity of memory blocks; and wherein the memory management program is further operable to reorder the components of the data structure such that rarely accessed components of the data structure are placed at the end of the component order before linking the allocated memory blocks.

9. The system of claim 8, further comprising:

a CPU; and a memory coupled to the CPU;

wherein the memory stores the heap and the memory management program, and wherein the memory management program is executable by the CPU.

10. The system of claim 8, wherein the data structure comprises an object.

11. The system of claim 10, further comprising instantiating the object in the allocated quantity of memory blocks.

12. The system of claim 8, wherein the list is a unidirectional list.

13. The system of claim 8, wherein the list is a bi-directional list.

14. The system of claim 8, further comprising:

a virtual machine, wherein the memory management program is executable by the virtual machine.

15. The system of claim 14, wherein the virtual machine is implemented in accordance with a platform-independent virtual machine specification.

16. A carrier medium comprising program instructions which are computer-executable to implement:

receiving a request to allocate storage for a data structure from a heap, wherein the heap comprises a plurality of memory blocks, and wherein each of the plurality of memory blocks is of a uniform fixed size;

determining the size of the data structure, wherein the data structure comprises one or more components in a particular order, wherein each of the one or more components does not exceed the fixed size, and wherein the determining the size of the data structure includes determining a quantity of the plurality of memory blocks required to store the components of the data structure;

allocating the required quantity of the memory blocks from the heap, wherein the allocated quantity of memory blocks includes at least two noncontiguous memory blocks;

linking the allocated memory blocks in a list such that the components of the data structure are partitioned in the particular order of the components across the allocated quantity of memory blocks; and reordering the components of the data structure such that rarely accessed components of the structure are placed at the end of the component order before said linking the allocated memory blocks.

17. The carrier medium of claim 16, wherein the data structure comprises an object.

18. The carrier medium of claim 17, wherein the program instructions are further computer-executable to implement instantiating the object in the allocated quantity of memory blocks.

19. The carrier medium of claim 16, wherein the list is a unidirectional list.

20. The carrier medium of claim 16, wherein the list is a bi-directional list.

21. The carrier medium of claim 16, wherein the program instructions are executable by a virtual machine.

22. The carrier medium of claim 21, wherein the virtual machine is implemented in accordance with a platform-independent virtual machine specification.

* * * * *